United States Patent [19]
Yumoto et al.

[11] Patent Number: 5,634,107
[45] Date of Patent: May 27, 1997

[54] DATA PROCESSOR AND METHOD OF PROCESSING DATA IN PARALLEL

[75] Inventors: Masahiro Yumoto; Kenichi Kobayashi, both of Kawasaki, Japan

[73] Assignee: Fujitsu Limited, Kawasaki, Japan

[21] Appl. No.: 540,029

[22] Filed: Oct. 6, 1995

Related U.S. Application Data

[63] Continuation of Ser. No. 160,179, Dec. 2, 1993, abandoned.

[30] Foreign Application Priority Data

Dec. 3, 1992 [JP] Japan ................... 4-324374

[51] Int. Cl.$^6$ ................... G06F 15/00
[52] U.S. Cl. ................... 395/438; 395/115; 395/116; 395/250; 395/800; 395/501; 395/507
[58] Field of Search ................... 395/162–164, 395/115–116, 250, 800

[56] References Cited

U.S. PATENT DOCUMENTS

| | | | |
|---|---|---|---|
| 4,839,798 | 6/1989 | Eguchi et al. | 395/650 |
| 5,193,179 | 3/1993 | Laprade et al. | 395/575 |
| 5,230,047 | 7/1993 | Frey, Jr. et al. | 395/575 |
| 5,410,672 | 4/1995 | Sodek, Jr. et al. | 395/872 |

FOREIGN PATENT DOCUMENTS 3-177961  8/1991  Japan .

OTHER PUBLICATIONS

Lee et al., "A Fully Distributed Parallel Ray Tracing Scheme on the Delta Touchstone Machine*," IEEE, Aug. 1993, pp. 129–134.

Cheng et al., "Dynamic Load Balancing Algorithms in Loosely–Coupled Real–Time Systems," IEEE, 1992, pp. 143–147.

*Primary Examiner*—Tod R. Swann
*Assistant Examiner*—Denise Tran
*Attorney, Agent, or Firm*—Staas & Halsey

[57] ABSTRACT

A plurality of data processing units each having a first controller for computing design data assigned in advance so as to generate graphic data and a first storage device for receiving transfer of the design data and storing the design data temporarily, and a second controller, for when a data storage allowable value of the first storage device which has received transfer of the design data is exceeded, recognizing a data excess flag rising on that occasion, and transferring excessive data in the design data assigned to the one data processing unit to another data processing unit, thereby controlling computation share among data processing units. The design data are converted in parallel into graphic data while monitoring is performed of the data processing units. By adopting such a structure, it is no longer required to increase the number of fields for reassigning design data more than necessary, and it is possible to achieve high-speed processing of parallel data, such as mask data, of the LSI within the capacity of the field memory given to the data processing units.

12 Claims, 10 Drawing Sheets

DATA PROCESSOR AND METHOD OF PROCESSING DATA IN PARALLEL

This application is a continuation of application Ser. No. 08/160,179, filed Dec. 2, 1993, now abandoned.

BACKGROUND OF THE INVENTION

1. Field of the Invention

The present invention relates to a data processor for computing various data in parallel and a method of processing data in parallel at high-speed, and more particularly, to a device for computing mask data of a semiconductor integrated circuit device (hereinafter referred to as an LSI) in parallel and improvement of a method of sharing computation thereof.

2. Description of the Prior Art

In recent years, a mask data processor for generating exposure data is utilized in a process of producing a reticle and a mask pattern of an LSI, and an image data processor for comparing image data is utilized in an inspection process thereof. With the demand for high function and high performance of these processors, a data processor in which a plurality of data processing units are provided in one system for computing various data in parallel is in the course of development.

Figure 1:
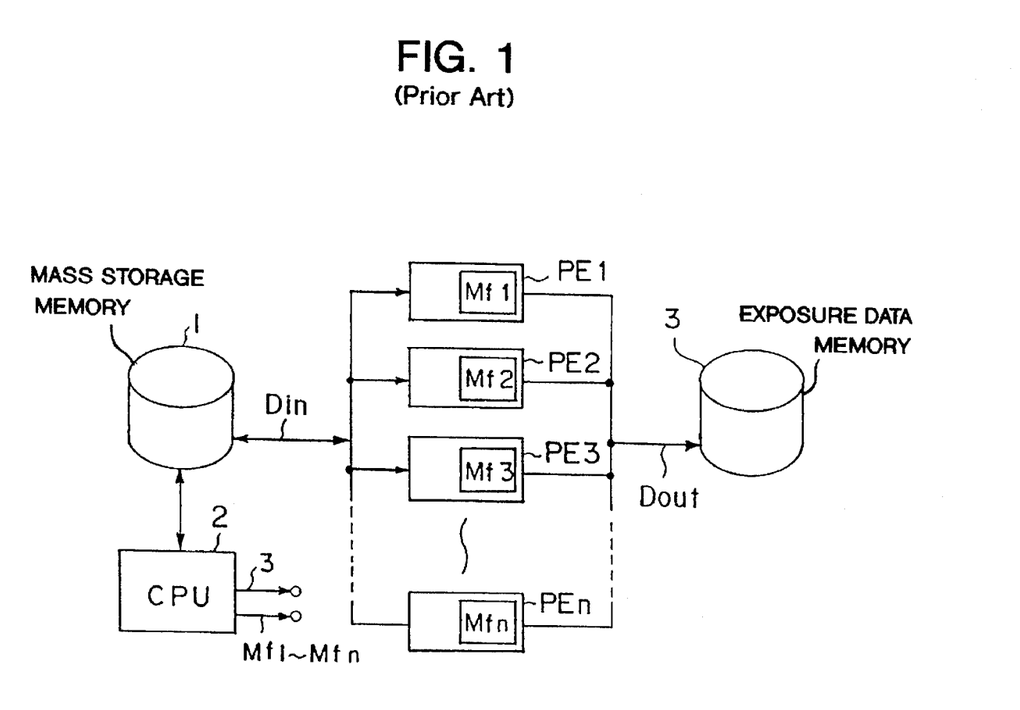
FIG. 1 is a block diagram of a mask data processor according to the prior art of the present invention.

Here, the prior art of the present invention will be described. For example, a mask data processor (a parallel computation system) for converting design data Din of an LSI into exposure data Dout comprises a mass storage memory 1, n pieces of data processing units PE1 to PEn, a central processing unit (CPU) 2, an exposure data memory 3 and so on as shown in FIG. 1. Besides, field memories Mf1 to Mfn for storing design data Din assigned to respective units PE1 to Pen temporarily are provided in those respective units. Here, the exposure data Dout is the data for exposing a mask pattern when a reticle of an LSI is formed.

The function of the system is such that, when the design data Din of an LSI are transferred to the mass storage memory 1, for instance, the design data Din concerned are split into blocks corresponding to exposure fields by the CPU 2. The split design data Din are supplied, and data format conversion, size alteration, data correction or the like (hereinafter referred to simply as parallel mask data processing) are performed by means of n pieces of data processing units PE1 to PEn, thereby storing the data in the exposure data memory 3 as exposure data Dout.

Figure 2:
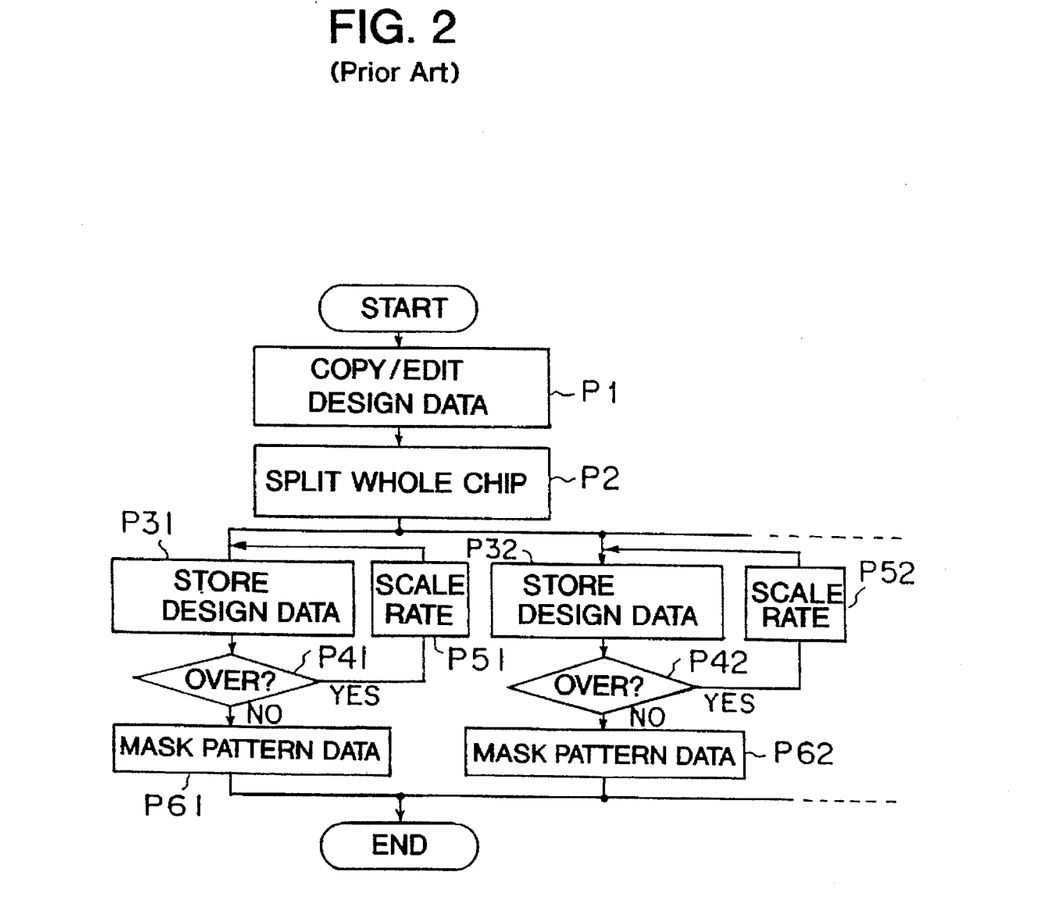
FIG. 2 is a flow chart of parallel mask data processing according to the prior art of the present invention.

Namely, in FIG. 2, the design data Din are copied to and edited in the mass storage memory 1 first in a step P1, and then the whole chips are split into uniform field sizes in a step P2. This is done for the purpose of reducing the number of pattern data in existence per one field, and it is possible to reduce the number of pattern data applied with parallel data processing in one unit by unifying the size (region) of the field. Here, the split design data Din in every field are transferred to respective data processing units PE1 to PEn.

Thereafter, the design data Din assigned to the processor PE1 concerned in a step P31 are stored in the first data processing unit PE1 for the purpose of executing parallel data processing. In parallel thereto, the design data Din assigned to the processing unit PE2 in a step P32 are stored in the second data processing unit PE2.

Next, it is judged whether a data storage allowable value of the first field memory Mf1 is exceeded or not by the CPU 2 in a step P41. At this time, when the data storage allowable value is exceeded (YES), a magnifying factor of the memory is altered in a step P51. Further, when the value is not exceeded (NO), the process is shifted to a step P61, and the parallel mask data processing is performed.

In parallel thereto, it is judged whether the data storage allowable value of the first field memory Mf2 is exceeded or not in a step P42 in the second processing unit PE2. In this case, when the data storage allowable value is exceeded (YES), the magnifying factor of the memory is altered in a step P52. Further, when the value is not exceeded (NO), the process is shifted to a step P62 and the parallel mask data processing is performed.

With this, the design data Din are processed in parallel by respective data processing units PE1 to PEn. As a result, the exposure data Dour in exposing a reticle or a mask pattern of an LSI are obtained.

Besides, a structural example of a data processor for filter-processing the image data in parallel will be described. A multiprocessor control unit is disclosed in Japanese Patent Provisional Publication "Laid-Open No. HEI3-177961" issued by the Japanese Patent Office. The control unit concerned comprises a plurality of digital signal processors connected in parallel, a state register for storing use states of the processors and the data bus and a data flow controller for allocating image data in frame units to respective processors based on the use states.

FIG. 2 illustrates a parallel data processing flowchart for a mask data processor according to prior art, in which the whole chip is split into uniform field sizes in a step P2 with respect to design data Din of an LSI stored in a mass storage memory 1. In parallel mask data processing, in general, the field is split so that the design data Din are stored at an allowable capacity or less of a field memory Mfn. Besides, the field memory Mfn is provided in respective data processing units PE1 to PEn. When pattern density of the LSI is high, however, both a pattern region where transistor elements and interconnection patterns are laid out in a complex fashion and a pattern region where the density thereof is low are split equally into fields of the same size.

As a result, the whole chip is split into uniform field sizes more than needed even in a region where the pattern density of the LSI is low. Hence, the number of fields of the data assigned to respective data processing units PE1 to PEn is increased. With this, the frequency of making access to the field memory Mfn is increased, thus wearing out the access time in idleness. Further, in the prior art, when the design data Din assigned to the data processing unit PEn concerned exceed the data storage allowable value of the field memory Mfn, a scale factor is altered in steps P51 and P52 in the flow chart of the parallel mask data processing shown in FIG. 2 in order to make the capacity of field memories Mfn of respective data processing units PEn small.

Figure 3:
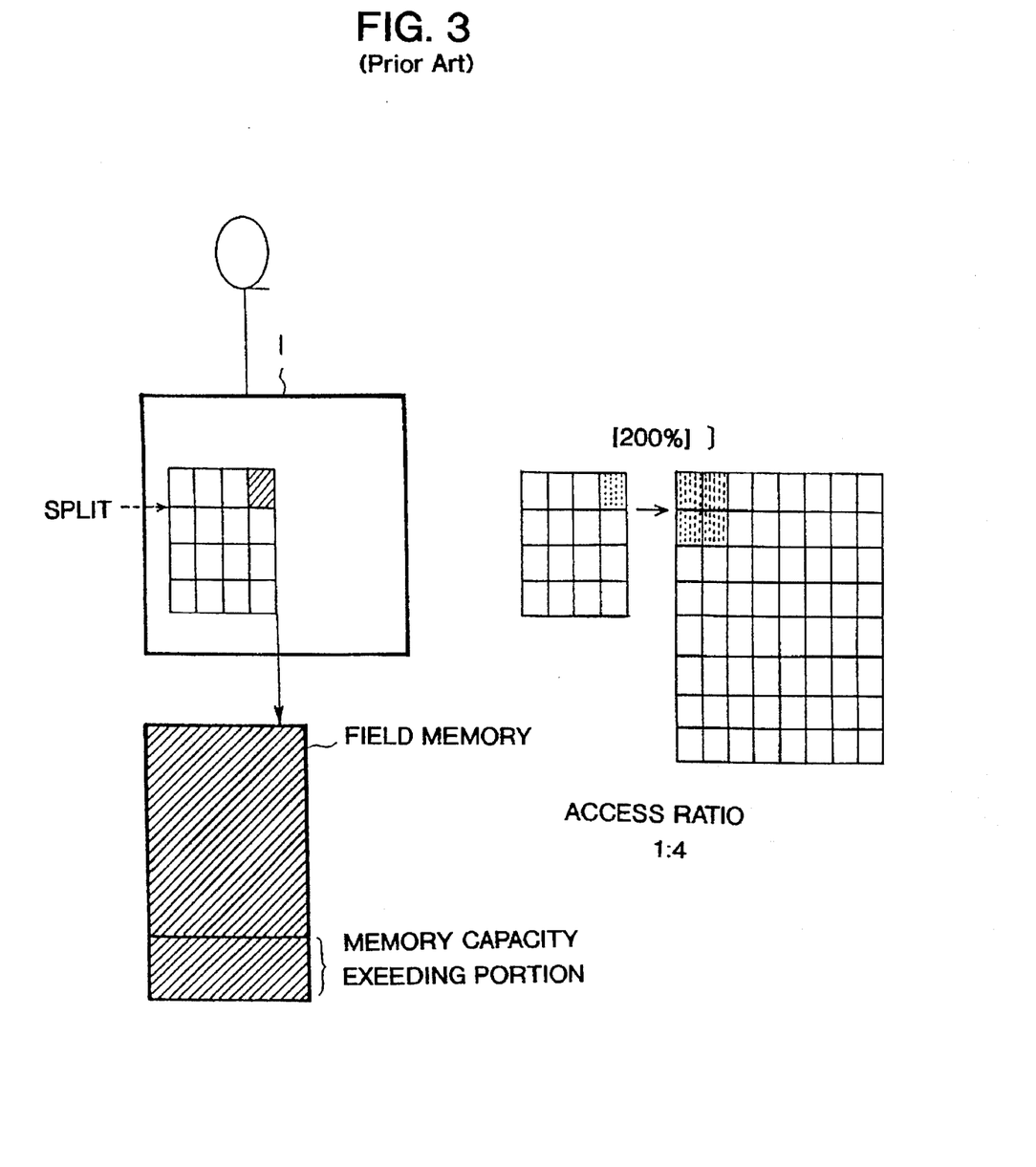
FIG. 3 is a diagram showing how to cope with the time of exceeding memory for explaining problems in the prior art of the present invention.

For example, when the design data Din assigned to a certain data processing unit PEn exceed the data storage allowable value as shown in FIG. 3, the scale factor of the whole is magnified double (200%) so as to perform parallel mask data processing as shown in FIG. 3. Here, "the scale factor of the whole is magnified double" means that the size of an original graphic object expressed by the originally assigned design data Din is enlarged. With this, the design data Din transferred to the field memory Mfn are reduced so that the design data Din may be contained within the allowable value.

Since the scale factor of the whole is increased, however, the number of fields is quadrupled, and the frequency of making access to the memory is also quadrupled. Thus, the access time is worn out in idleness. Further, since the number of mask patterns per unit area of the mask region is increased with the mass storage of the design data Din, a shortage in the capacity of the mass storage memory 1 and the field memory Mfn is incurred. With this, in a storage system having field memories Mfn for handling the mask pattern data in every hierarchy, there is such a problem that the parallel mask data processing is interrupted when a shortage of the memory is produced in any region of respective hierarchies. Due to such a fact, the size of the field is compelled to be altered. As a result, there is a problem that the field has to be resplit, which becomes an obstacle in achieving high-speed parallel mask data processing.

Further, a multiprocessor control unit according to the prior art for filter-processing image data in parallel is disclosed in Japanese Patent Provisional Publication "Laid-Open No. HEI3-177961". In the control unit concerned, a system wherein image data in frame units are allocated to respective processors based on use states of a digital signal processor and a data bus and are filter-processed in parallel is adopted. However, no method whatsoever of concrete processing of parallel data is disclosed for a case where the data allocated to respective processors include unevenness in the pattern density and data exceeding the memory are assigned.

SUMMARY OF THE INVENTION

It is an object of the present invention, when design data beyond data processing performance are assigned to data processing units, to share these data among the data processing units and to compute the data in parallel within the data processing performance of respective units.

It is another object of the present invention achieve high-speed parallel data processing within the storage capacity given to the data processing units.

As in a preferred embodiment according to the present invention, a data processor is provided with a plurality of data processing units each having a first storage device for receiving transfer of design data assigned in advance and storing the design data temporarily and a first controller for computing the design data so as to generate graphic data, and a second controller, when the data storage allowable value of the first storage device which has received transfer of these design data is exceeded, for recognizing a data excess flag rising on that occasion and transferring excessive data among design data assigned to the data processing units to another data processing unit so as to control the computation share among data processing units, and converts the design data into graphic data in parallel while monitoring the data processing units.

Further, the method of processing data in parallel according to the present invention is a method of generating graphic data by computing design data assigned in advance in parallel by means of a plurality of data processing units so as to generate graphic data, in which data processing performance of the data processing units is monitored, and, when design data beyond the performance are assigned to the data processing units, excessive data among the assigned design data are transferred to another data processing unit, and the other data processing unit computes the excessive data and generates graphic data.

By adopting such a structure and a method, it is no longer required to provide a larger number of fields than needed for reassigning the design data, and a high-speed parallel data processing of mask data of an LSI or the like can be achieved within the capacity of the field memory given to the data processing units.

Further, it is not required to alter the magnifying factor as the prior art of the present invention, which contributes to improvement of reliability of the data processor concerned.

DESCRIPTION OF THE PREFERRED EMBODIMENTS

Figure 4:
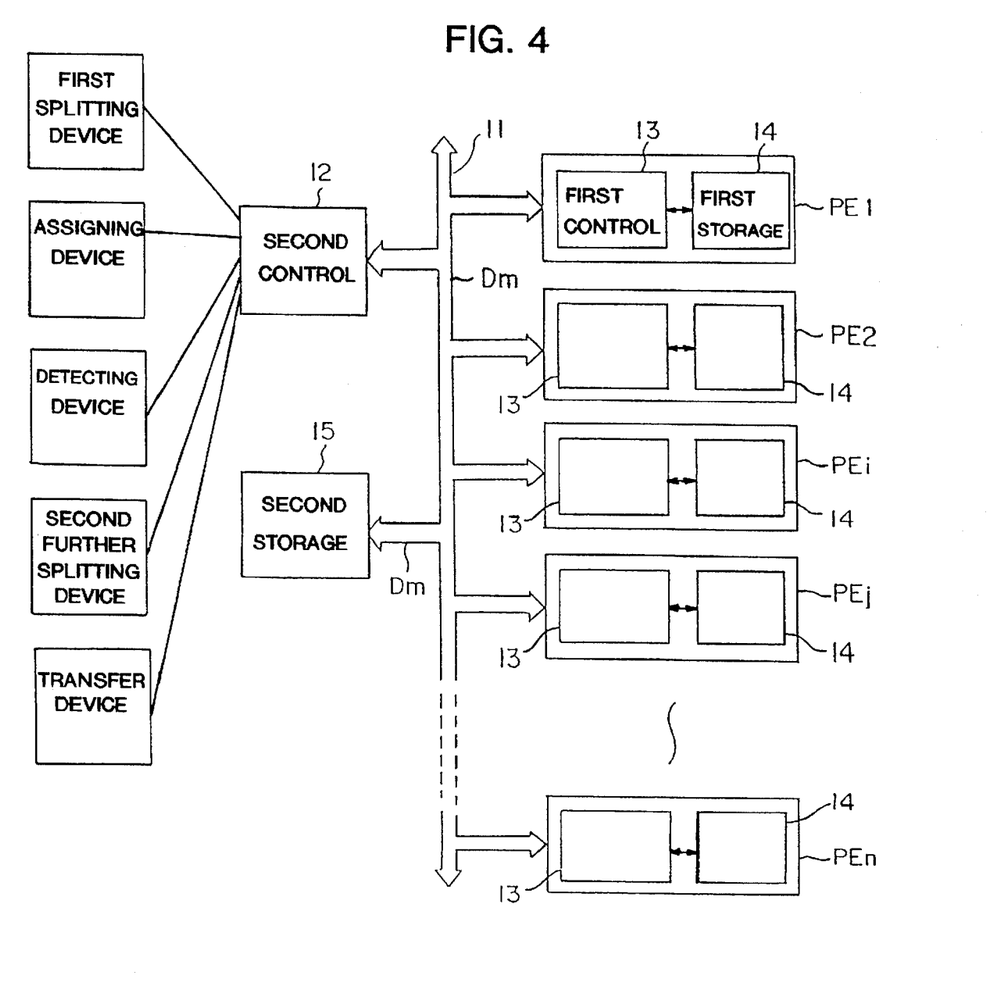
FIG. 4 is a block diagram of a data processor in principle according to the present invention.

As against the above, the data processor in principle according to the present invention is provided with a plurality of data processing units PEn [n=1, 2, i, j to n], shown in FIG. 4, each having a first storage device 14 for receiving transfer of design data Dm assigned in advance and storing the design data Dm temporarily and a first controller 13 for computing the design data Dm so as to generate graphic data Dout, and a second controller 12, for, when a data storage allowable value of the first storage device 14 which has received the transfer of the design data Dm is exceeded, recognizing a data excess flag rising on that occasion, and transferring excessive data Da among the design data Dm assigned to the data processing units PEi to other data processing units PEj, thereby controlling computation share among the data processing units PE1 to PEn, and converts the design data Dm into graphic data Dout in parallel while monitoring the data processing units PE1 to PEn.

Further, there is provided a second storage device 15 for storing the design data Dm formed in a hierarchical structure for assigning to the data processing units PEn [n=1, 2, i, j to n].

Figure 6:
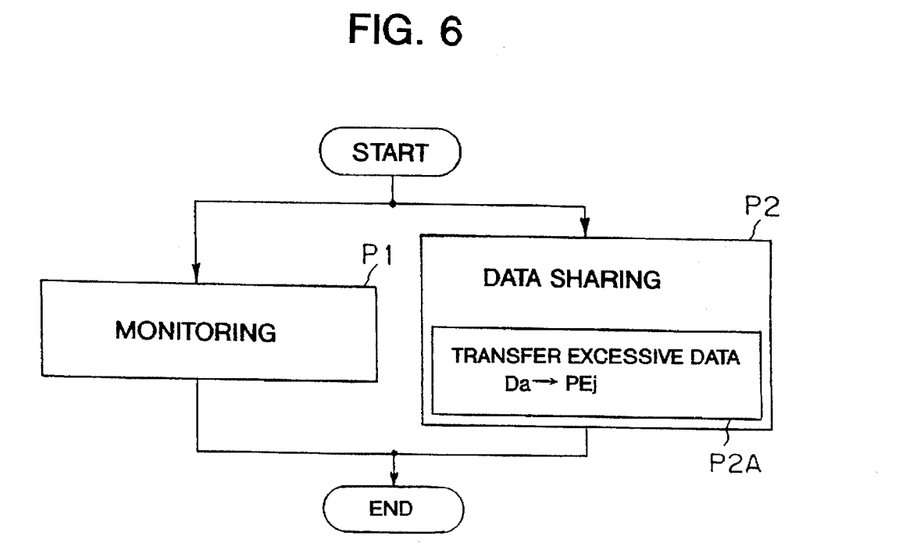
FIG. 6 is a flow chart of a method of processing data in parallel in principle according to the present invention.

Furthermore, the method of processing data in parallel in principle according to the present invention is a method of computing preallocated design data Dm assigned in advance in parallel by means of a plurality of data processing units PEn [n=1, 2, i, j to n] so as to generate graphic data Dour, and, as shown in a flow chart of parallel data processing in principle in FIG. 6, data processing performance of the data processing units PE1 to PEn is monitored in a step P1, and the data share is controlled in a step P2 when the design data Dm exceeding the data processing performance are assigned to the data processing units PEi. Namely, excessive data Da among the design data Dm assigned previously, in a step P2A, are transferred to another data processing unit PEj and the excessive data Da are computed by the other processing units PEj so as to generate graphic data Dour.

Further, when the data storage allowable value of the data processing units PEn [n=1, 2, i, j to n] is exceeded in monitoring the data processing performance of the data processing units PE1 to PEn, a data excess flag rising on that occasion is recognized.

Next, the operation of a data processor in principle according to the present invention will be described. For example, when the design data Dm having pattern data formed in a hierarchical structure as the contents thereof are split uniformly by the second controller 12, the design data Dm [m=1, 2, i, j to n] are read out of the second storage device 15 in order to assign the split design data Dm to respective data processing units PEn [n=1, 2, i, j to n]. Further, when the design data Dm are transferred from the second storage device 15 to respective data processing units PEn [n=1, 2, i, j to n] through the data bus 11, the process is shifted to parallel data processing in the plurality of data processing units PEn [n=1, 2, i, j to n].

Here, respective data processing units PE1 to PEn are monitored by the second controller 12, and data share is controlled by the second controller 12. For example, in a certain data processing unit PEi, the design data Dm assigned previously to the first storage device 14 through the first controller 13 are stored temporarily.

At this time, when the data storage value of the first storage device 14 is exceeded, the data excess flag thereof rises. Thus, such a fact is recognized by the second controller 12, and the excessive data Da, see FIG. 5, among the design data Dm assigned to the processing unit PEi are transferred to another data processing unit PEj in order to control data share among the data processing units PE1 to PEn (data share control).

Figure 5:
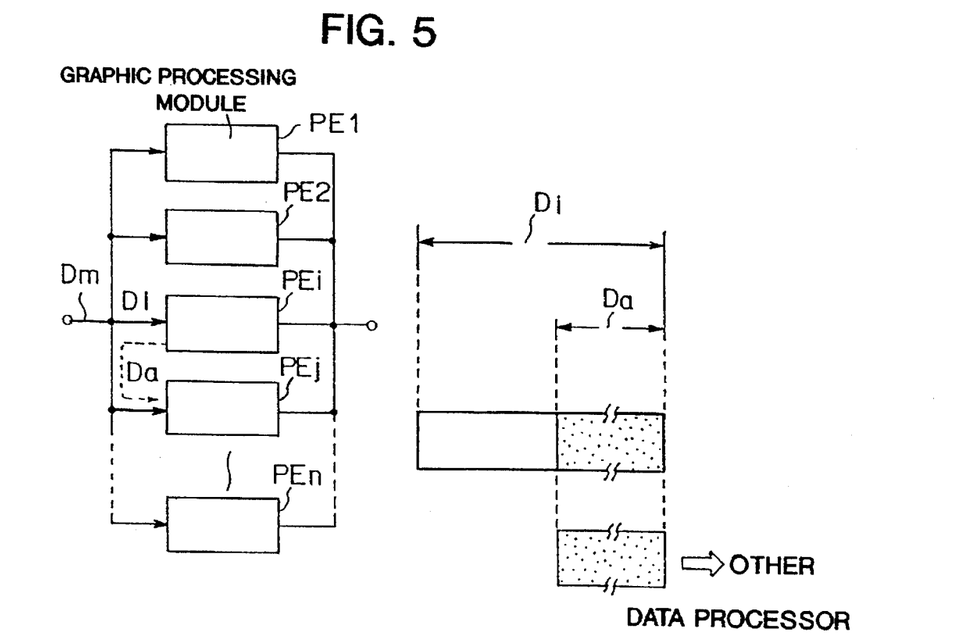
FIG. 5 shows a block diagram of a data processing unit supplementing FIG. 4 and an explanatory diagram at time of exceeding memory.

Thus, when the data storage allowable value of the first storage device 14 is not exceeded, the design data Dm assigned in advance are received and processed in parallel by the first controller 13. When the data storage allowable value is exceeded, however, the excessive data Da are transferred to another data processing unit PEj. Thus, the excessive data Da are processed in parallel by the first controller 13 of the unit PEj which is supplied with Da. For example, the first controller 13 performs data transfer between adjacent data processing units PEi and PEj, format conversion of the design data Dm, restoration of the design data Dm and so on.

With this, it becomes possible to aim at a higher speed of parallel data processing within the data storage allowable value of the first storage device 14 given to the data processing unit PEj without increasing the number of fields of the design data Dm more than necessary.

Furthermore, according to the method of processing data in parallel of the present invention, when share allocation data Di allocated to optional data processing unit PEi exceed the allowable value of the data processing performance of the processing unit PEi concerned, that is, when the data excess flag is generated from the data processing unit PEi exceeding the data processing performance, the excessive data Da therein are transferred to another data processing unit PEj in the step P2A as shown in a flow chart of parallel data processing in FIG. 6.

As a result, even when the design data Dm showing the whole graphic object are split equally into fields having the same size in regard to a case of including pattern data of high density in the design data Dm and a case that the density is not so high, it becomes possible to control the increase of the number of fields and the number of resplitting to the utmost by controlling data share among data processing units PE1 to PEn.

Further, according to the method of processing data in parallel of the present invention, alteration of the scale factor like the prior art of the present invention is not required even when a small capacity of the first storage device 14 of respective data processing units PE1 to PEn is desired.

Furthermore, the situation an insufficient data storage allowable value in any region of respective hierarchies as in the prior art of the present invention is controlled to the utmost, thus making it possible to delete interruption of parallel data processing caused by the above and so on.

Figure 7:
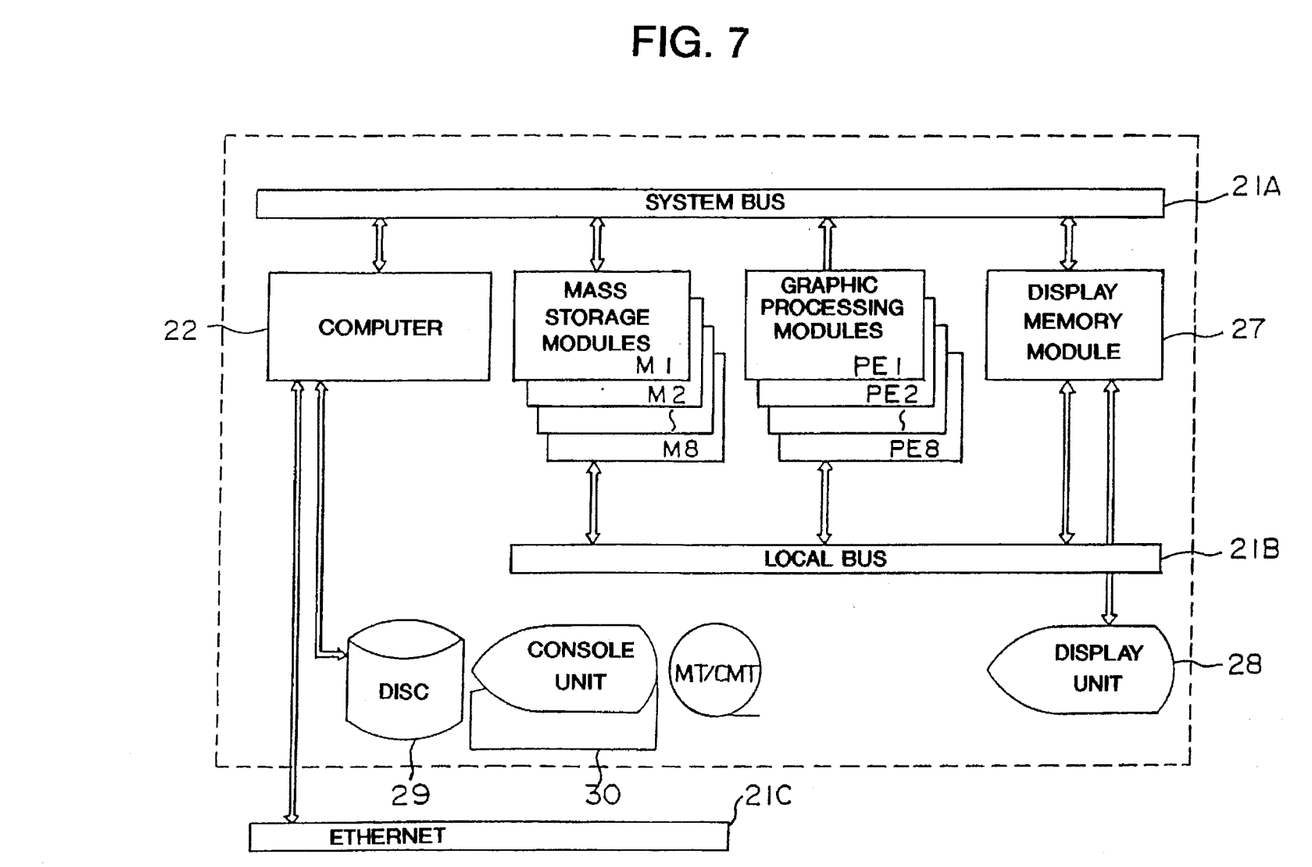
FIG. 7 is a block diagram of a mask data processor according to the preferred embodiment of the present invention.

Next, preferred embodiments of the present invention will be described with reference to the drawings. For example, a mask data processor which is an example of a data processor receives the design data Din of the LSI device and generates exposure data Dour for exposing a reticle or a mask pattern thereof. In FIG. 7, the processor comprises mass storage modules M1 to M8, high-speed graphic processing modules PE1 to PE8 and a memory module 27 connected to a system bus 21A and a local bus 21B, a computer 22 connected to the system bus 21A, another display unit 28, a disc unit 29, a console unit 30 or the like.

Namely, the high-speed graphic processing modules PE1 to PE8 are embodiments of a plurality of data processing units PEn [n=8]. They receive mask data D1, D2 . . . which are embodiments of the design data Dm [m=1 to n] and perform parallel data processing, and output the exposure data Dour for exposing a reticle or a mask pattern of an LSI as the result. Besides, respective high-speed graphic processing modules PE1 to PE8 will be described in detail in FIG. 8.

Further, the computer 22 is an embodiment of the second controller 12 for monitoring the high-speed graphic processing modules PE1 to PE8. For example, the computer 22 controls data share among high-speed graphic processing modules PE1 to PE8. Here, the control of data share means, when mask data D1 assigned to a certain high-speed graphic processing module PE1 exceed a data storage allowable value of a field memory 24, transference of the excessive data Da therein to other high-speed graphic processing modules PE2 to PE8.

More specifically, when the mask data D1 temporarily assigned to the field memory 24 of a certain high-speed graphic processing module PE1 exceeds the data storage allowable value in parallel mask data processing, the computer 22 recognizes the data excess flag, subtracts exceeding data quantity from the data quantity of a previously split field, and judges how far the remaining data are to be split further.

Namely, the computer 22 now alters the size of the field which has overflown (resplitting the field) so as to reprocess only the field concerned and now splits only the field which has overflown more finely. Besides, when any one of split fields exceeds the data storage allowable value of the field memory 24, the field concerned is split further, and the splitting is repeated.

Further, the mass storage memory modules M1 to M8 constitute an embodiment of the second storage device 15 and store the design data Din formed in a hierarchical structure. "The design data Din formed in a hierarchical structure" means design data split in every block obtained by splitting the whole chip into a plurality of blocks when the reticle or the mask pattern of a large-scale LSI is produced.

For example, the first design data Din formed in a hierarchical structure are stored in the mass storage memory module M1, and a second to an eighth design data Din formed in a hierarchical structure are stored successively in the mass storage memory modules M2 to M8.

Further, the display memory module 27 stores display data such as graphics, interconnection, symbols and titles required for parallel mask data processing, and the display unit 28 receives display data and displays them. The disc unit 29 stores the design data Din of the LSI in a form of a magnetic tape MT, and the console unit 30 copies and edits the data Din. Besides, the system bus 21A and the local bus 21B are examples of a data bus 11 (see FIG. 4), which transfer the design data Din.

Figure 8:
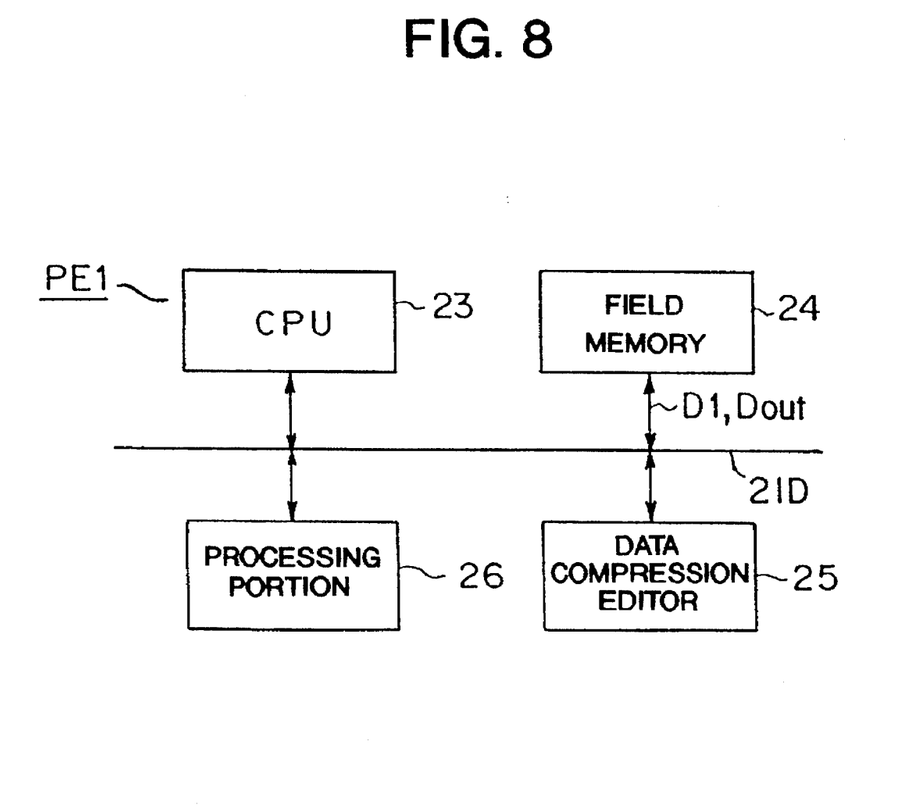
FIG. 8 is a block diagram of the inside of a high-speed graphic operational module of a mask data processor according to the embodiment of the present invention shown in FIG. 7.

Next, a high-speed graphic processing module according to a preferred embodiment of the present invention will be described. For example, the first high-speed graphic processing module PE1 comprises a central processing unit (CPU) 23, a field memory 24, a data compression editor 25 and other processing portion 26 as shown in FIG. 8.

Namely, the central processing unit (CPU) 23 is an example of the first controller 13, and it receives assigned mask data (a part of the design data Din) D1 and performs parallel data processing. For example, the CPU 23 performs data format conversion, size alteration, data correction and so on. Other than the above, the CPU 23 writes the mask data D1 in the field memory 24, and transfers the exposure data Dout to the mass storage memory module M1 or the like when parallel data processing for one field portion is terminated.

Further, the field memory 24 is an example of the first storage device 14, and stores the assigned mask data D1 for one field portion temporarily. For example, the field memory 24 notifies a memory over flag (data excess flag) of the CPU 23 when the data storage allowable value is exceeded, and the CPU 23 transfers the notification to the computer 22. Besides, the data compression editor 25 compresses data applied with parallel mask data processing, and other processing portion 26 is a functional editor for returning the compressed data to an original state.

Here, the operation of respective high-speed graphic processing modules will be described. For example, when the design data Din formed in a hierarchical structure are split into uniform fields by the computer 22, the mask data D1 to D8 are read out of the mass storage memory modules M1 to M8 in order to assign the uniform fields to respective high-speed graphic processing modules PE1 to PE8. Further, when the mask data D1 to D8 are transferred to respective high-speed graphic processing modules PE1 to PE8 from the mass storage memory modules M1 to M8 through the system bus 21A, the process is shifted to parallel mask data processing in the plurality of high-speed graphic processing modules PE1 to PE8.

Respective high-speed graphic processing modules PE1 to PE8 are monitored by the computer 22, and data share is controlled by the computer 22. For example, in the first high-speed graphic processing module PE1, the previously assigned mask data D1 are stored temporarily in the field memory 24 through the CPU 23 thereof.

At this time, when the data storage allowable value of the field memory 24 is exceeded, the memory over flag rises, and this fact is recognized by the computer 22. The computer 22 transfers the excessive data Da in the mask data D1 assigned to the processing unit PE1 concerned to another high-speed graphic processing module PE2 or any of PE3 to PE8 in order to control data share among the high-speed graphic processing modules PE1 to PE8 (data share control).

In such a manner, according to a data processor related to a preferred embodiment of the present invention, there are provided eight pieces of high-speed graphic processing modules PE1 to PE8. A computer 22 and mass storage memory modules M1 to M8 are connected to the system bus 21A as shown in FIG. 7, and the computer 22 controls data share among the high-speed graphic processing modules PE1 to PE8.

As a result, when the data storage allowable value of the field memory 24 is not exceeded, parallel mask data are processed by means of the CPU 23 of the high-speed graphic processing module PE1 which has received mask data D1 assigned in advance. Further, in the other high-speed graphic processing modules PE2 or PE3 to PE8, the excessive data Da are supplied, and parallel mask data processing is performed by the CPU 23. For example, it becomes possible to perform data transfer between adjacent high-speed graphic processing modules PE2 and PE3, format conversion of the mask data D2, restoration of compressed exposure data Dour and so on by means of the module PE2 or PE3 to PE8.

With this, it becomes possible to aim at achieving high-speed parallel mask data processing within the data storage allowable value of the field memory 24 given to respective high-speed graphic processing modules PE1 to PE8 without increasing the number of fields of the mask data D1, D2 ... more than necessary.

Next, a method of processing data in parallel according to a preferred embodiment of the present invention will be described while supplementing the operation of the device concerned. For example, when parallel mask data are processed by means of eight pieces of high-speed graphic processing modules PE1 to PE8, data share among the high-speed graphic processing modules PE1 to PE8 is controlled in steps P41 to P48 in FIG. 10 while monitoring data processing performance of the high-speed graphic processing modules PE1 to PE8 in a step P3.

Figure 10:
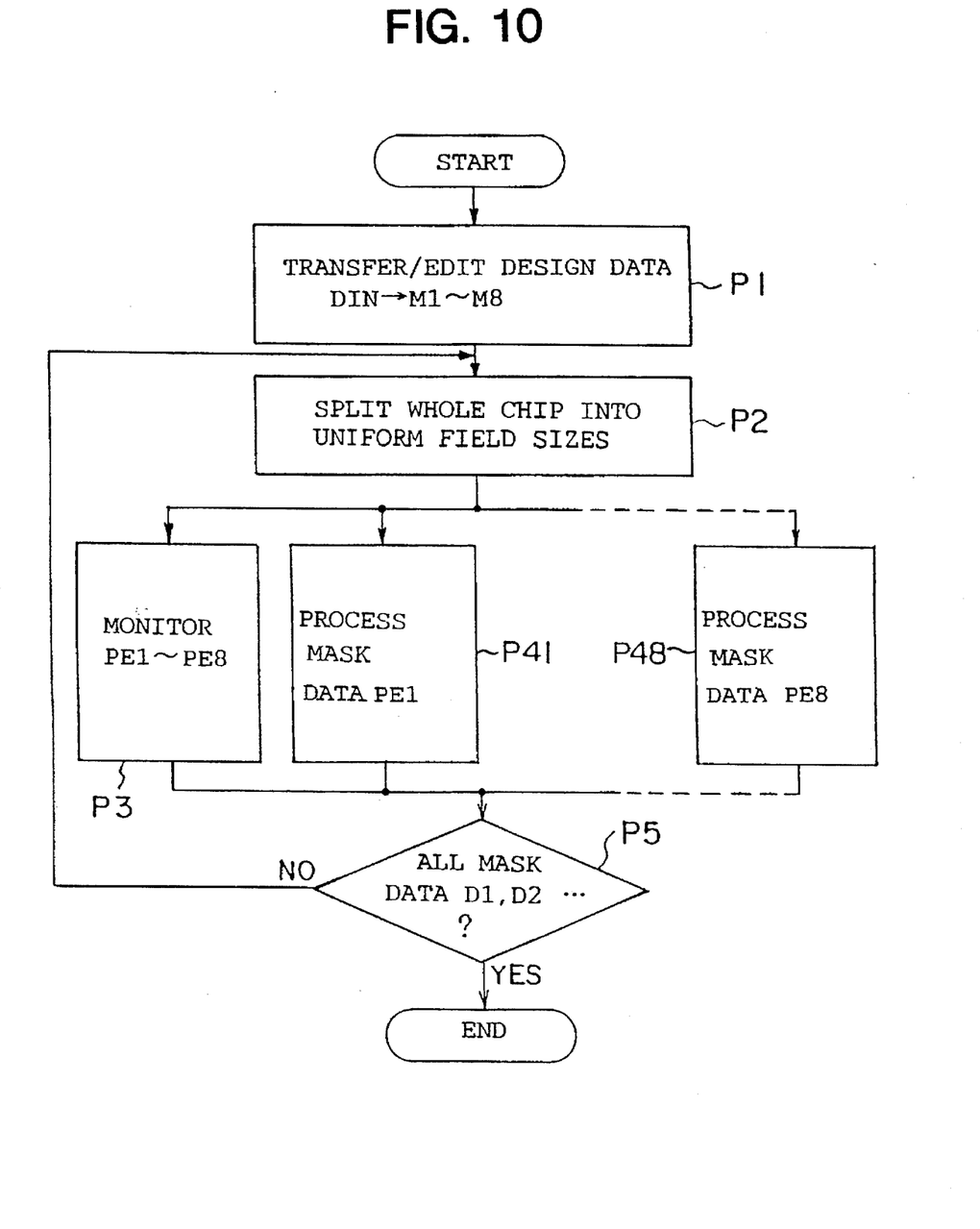
FIG. 10 is a flow chart of a parallel mask data processing (main routine) according to the preferred embodiment of the present invention.

Namely, as shown in FIG. 10, the design data Din are copied into the mass storage memory modules M1 to M8 and edited in a step P1. At this time, the design data Din of the LSI are stored in the mass storage memory modules M1 to M8 from the magnetic tape MT housed in the disc unit 29 through the console unit 30. For example, the design data Din are formed in a hierarchical structure related to the reticle or the mask pattern of the LSI. The first design data Din formed in a hierarchical construction are stored in the mass storage memory module M1, and the second to the eighth design data Din each formed in a hierarchical structure are stored successively in the mass storage memory modules M2 to M8, respectively.

Next, the whole chip is split into uniform field sizes in a step P2. In a preferred embodiment of the present invention, the whole chip is split into uniform fields so that the data capacity in a region having high pattern density and the data capacity in a region having low pattern density may be lower than the data storage allowable value of the field memory 24 provided in respective high-speed graphic processing modules PE1 to PE8. Then, the data processing performance of the high-speed graphic processing modules PE1 to PE8 is monitored in a step P3.

In parallel thereto, parallel mask data are processed in the first high-speed graphic processing module PE1 in the step P41. For example, as shown in a processing flow chart in FIG. 9, mask data (hereinafter referred to also as share allocation data) D1 are inputted first in the step P401, and then written in the field memory 24 in a step P402.

Figure 9:
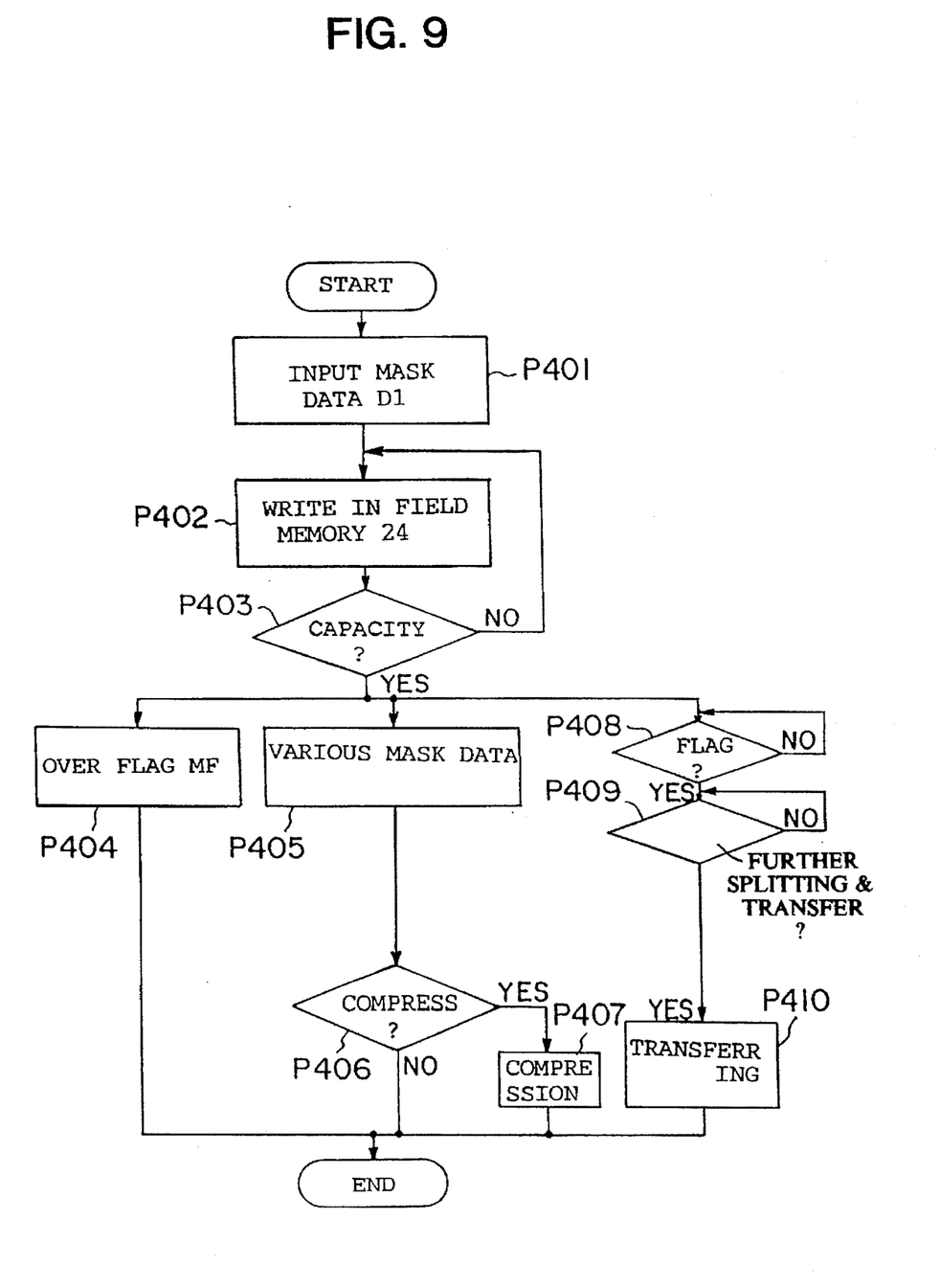
FIG. 9 is an operation flow chart of a high-speed graphic operational module according to the embodiment of the present invention shown in FIG. 8.

Next, it is judged whether the data storage allowable value of the field memory 24 is exceeded or not in a step P403. At this time, when the data storage allowable value is exceeded (YES), the process is shifted to steps P404, P405 and P408, respectively. Further, when the allowable value is not exceeded (NO), the process is returned to the step P402 and writing is continued.

Accordingly, when the data storage allowable value is exceeded (YES), a memory over flag is generated first in the step P404. Further, parallel mask data processing is started in the step P405. On the other hand, it is monitored whether the memory over flag has risen or not in a step P408. At this time, generation of the memory over flag in the step P404 is recognized by the CPU 23, and this information is transferred to the computer 22.

The computer 22 recognizes the memory over flag and determines how to treat the overflown field. In other words, the computer determines how to re-divide the overflown field.

Figure 11:
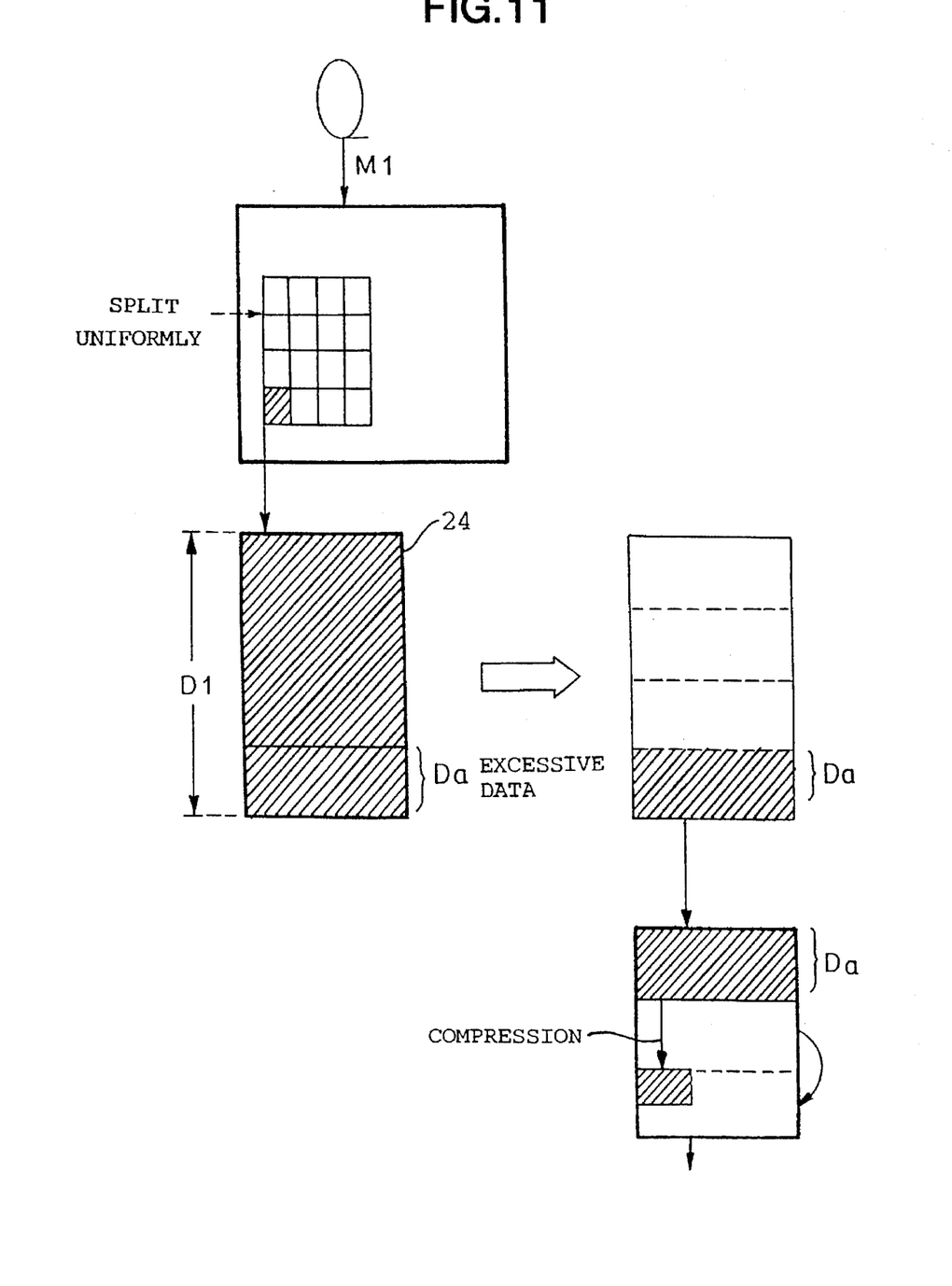
FIG. 11 is a diagram showing how to cope with the time of exceeding memory in parallel mask data processing according to the embodiment of the present invention shown in FIG. 10.

For example, as shown in FIG. 11, the computer 22 determines the size of the excessive data Da and sends the excessive data Da into another field memory.

Thereafter, an instruction indicating the destination of the excessive data Da is waited for in a step P409, and the excessive data Da are transferred to an indicated high-speed graphic processing module PEx when indication of the destination is given (YES) from the computer 22. Besides, it is Judged whether the exposure data Dout are to be compressed or not in the step P406 in parallel mask data processing in the step P405. At this time, when the data Dout are compressed (YES), the data are compressed in the step P407, and the exposure data Dout applied with parallel data processing are stored in the field memory 24 thereafter. Data compression is effective when a graphic pattern is repeated.

In a similar manner, parallel mask data processing is performed in the eighth high-speed graphic processing module PE8 in a step P48. Then, the end of parallel data processing of all the mask data D1, D2, . . . is judged in a step P5 of the main routine. At this time, when the parallel data processing does not come to an end (NO), the process is returned to the step P2 and the whole chip is split into uniform field sizes. Further, when the parallel data processing comes to an end (YES), parallel mask data processing is terminated.

In such a manner, according to the method of processing mask data in parallel related to a preferred embodiment of the present invention, data share among high-speed graphic processing modules PE1 to PE8 is controlled in steps P41 to P48 while monitoring data processing performance of the high-speed graphic processing modules PE1 to PE8 in the step P3 as shown in the flow chart in FIG. 10.

As a result, it becomes possible to control an increase of the number of fields and an increase of the number of field resplitting to the utmost by controlling data share among high-speed graphic processing modules PE1 to PE8 even when a pattern region where transistor elements and interconnection patterns having high pattern density of an LSI are involved in a complex fashion and a pattern region having low pattern density are split equally into fields having the same size.

Further, according to a preferred embodiment of the present invention, alteration of the scale factor as the prior art of the present invention is not required even when small capacity of the field memory 24 of respective high-speed graphic processing modules PE1 to PE8 is desired.

As a result, the situation that the capacity of the field memory becomes short in some region of respective hierarchies as in the prior art of the present invention disappears, thus making it possible to remove interruption of parallel data processing or the like. With this, alteration of the size of the field becomes unnecessary, and, as a result, the field of the whole chip does not need to be resplit.

With this, it becomes possible to perform high-speed parallel data processing of mask data D1, D2, . . . by means of eight pieces of high-speed graphic processing modules PE1 to PE8 as shown in FIG. 7. Further, it becomes possible to restrain an increase of the capacities of mass storage memory modules M1 to M8 and the field memory 24 even when the number of mask patterns per unit area of the LSI is increased with formation of mass storage of the design data Din.

As a result, an area in which an LSI pattern density is low enough is no longer split into smaller sections, unnecessarily. This means that the number of fields to be assigned to high-speed graphic processing modules PE1 to PE8 does not increase by much.

Further, since the scale factor on the whole is not increased as experienced in the prior art of the present invention, the number of fields is not increased, but it becomes possible to reduce the frequency of seeking access to the field memory 24. Thus, the access time is not wasted in idleness.

What is claimed is:

1. A data processor for generating graphic data based on design data for a semiconductor integrated circuit, comprising:

a plurality of data processing units connected to a data bus, each of said plurality of data processing units including:

(a) a first storage device, having a data storage allowable value, to temporarily store design data assigned to each of said plurality of data processing units, and (b) a first controller which sets up a data excess flag if said design data has an amount in excess of said data storage allowable value of said first storage device and are assigned to said data processing unit when said first controller generates graphic data by computing said design data;

a second storage device connected to said data bus, to store said design data which are to be transferred to said respective first storage devices in said plurality of data processing units; and a second controller connected to said data bus, to adjust a computation share among said plurality of data processing units while monitoring said data excess flag, said second controller including:

(a) first means for splitting a layout region of said semiconductor integrated circuit into a plurality of fields, (b) means for assigning said design data belonging to said plurality of fields to respective data processing units, (c) means for detecting said data excess flag set up in said data processing unit to which said design data are assigned, (d) second means for further splitting only a field including said design data assigned to said data processing unit in which said data excess flag is set up into smaller fields if said data excess flag is detected, and (e) means for transferring said design data included in said smaller fields respectively from said second storage device to said first storage devices of said data processing units in which said data excess flag is not set up.

2. A data processor according to claim 1, wherein said design data are formed as a hierarchical structure for said semiconductor integrated circuit and are stored in said second storage device.

3. A data processor for converting mask data for a semiconductor integrated circuit into exposure data, comprising:

a plurality of data processing units connected to a data bus, each of said plurality of data processing units including:

(a) a first storage device, having a data storage allowable value, to temporarily store mask data assigned to each of said plurality of data processing units, and (b) a first controller which sets up a data excess flag if said mask data has an amount in excess of said data storage allowable value of said first storage device and are assigned to said data processing unit when said first controller converts said mask data into exposure data;

a second storage device connected to said data bus, to store said mask data which are to be transferred to said respective first storage devices in said plurality of data processing units; and a second controller connected to said data bus, to adjust a computation share among said plurality of data processing units while monitoring said data excess flag, said second controller including:

(a) first means for splitting a layout region of said semiconductor integrated circuit into a plurality of fields, (b) means for assigning said mask data belonging to said plurality of fields to respective data processing units, (c) means for detecting said data excess flag set up in said data processing unit to which said mask data are assigned, (d) second means for further splitting only a field including said mask data assigned to said data processing unit in which said data excess flag is set up into smaller fields if said data excess flag is detected, and (e) means for transferring said mask data included in said smaller fields respectively from said second storage device to said first storage devices of said data processing units in which said data excess flag is not set up.

4. A data processor according to claim 3, wherein said mask data are formed as a hierarchical structure for said semiconductor integrated circuit and are stored in said second storage device.

5. A data processor for generating graphic data to form a reticle based on design data for a semiconductor integrated circuit, comprising:

a plurality of graphic processing modules connected to a data bus, each of said plurality of graphic processing modules including:

(a) a field memory, having a data storage allowable value, to temporarily store design data assigned to each graphic processing module, and (b) a sub-processing control device which sets up a data excess flag if said design data has an amount in excess of said data storage allowable value of said field memory and are assigned to said graphic processing module when said sub-processing control generates graphic data by computing said design data;

a main memory connected to said data bus, to store said design data which are to be transferred to respective field memories in said plurality of graphic processing modules; and a main processing control device connected to said data bus, to adjust a computation share among said plurality of graphic processing modules, said main processing control device including:

(a) first means for splitting a layout region of said semiconductor integrated circuit into a plurality of fields, (b) means for assigning said design data belonging to said plurality of fields to respective graphic processing modules, (c) means for detecting said data excess flag set up in said graphic processing modules to which said mask data are assigned, (d) second means for further splitting only a field including said design data assigned to said graphic processing modules in which said data excess flag is set up into smaller fields if said data excess flag is detected, and (e) means for transferring said design data included in said smaller fields respectively from said main memory to said field memories of said graphic processing modules in which said data excess flag is not set up.

6. A data processor for converting mask data for a semiconductor integrated circuit into exposure data for mask exposure, comprising:

a plurality of graphic processing modules connected to a data bus, each of said plurality of graphic processing modules including:

(a) a field memory, having a data storage allowable value, to temporarily store said mask data assigned to each graphic processing module, and (b) a sub-processing control device which sets up a data excess flag if said mask data has an amount in excess of said data storage allowable value of said field memory and are assigned to said graphic processing module when said sub-processing control device converts said mask data into exposure data;

a main memory connected to said data bus, to store said mask data which are to be transferred to respective field memories in said plurality of graphic processing modules; and a main processing control device connected to said data bus, to adjust a computation share among said plurality of graphic processing modules, said main processing control device including:

(a) first means for splitting a layout region of said semiconductor integrated circuit into a plurality of fields, (b) means for assigning said mask data belonging to said plurality of fields to respective graphic processing modules, (c) means for detecting said data excess flag set up in said graphic processing modules to which said mask data are assigned, (d) second means for further splitting only a field including said mask data assigned to said graphic processing modules in which said data excess flag is set up into smaller fields if said data excess flag is detected, and (e) means for transferring said mask data included in said smaller fields respectively from said main memory to said field memories of said graphic processing modules in which said data excess flag is not set up.

7. A method of generating graphic data by computing design data for a semiconductor integrated circuit in parallel, for use in a data processor including a plurality of data processing units connected to a data bus, each of said plurality of data processing units having a data storage allowable value and generating said graphic data by computing said design data assigned to each data processing unit, and a controller connected to said data bus, for adjusting a computation share among said plurality of data processing units, said method comprising the steps of:

splitting a layout region of said semiconductor integrated circuit into a plurality of fields;

comparing an amount of design data included in said plurality of fields with a data storage allowable value of said data processing units, respectively;

detecting a data excess flag set up in said data processing unit to which said design data are assigned;

further splitting only a field including said design data into smaller fields if said amount of design data exceeds said data storage allowable value; and transferring said design data included in said smaller fields to said data processing unit in which said data excess flag is not set up.

8. A method of converting mask data for a semiconductor integrated circuit into exposure data in parallel, for use in a data processor including a plurality of data processing units connected to a data bus, each of said plurality of data processing units having a data storage allowable value and converting said mask data assigned to each data processing unit into said exposure data, and a controller connected to said data bus, for adjusting a computation share among said plurality of data processing units, said method comprising the steps of:

splitting a layout region of said semiconductor integrated circuit into a plurality of fields;

comparing an amount of mask data included in said plurality of fields with a data storage allowable value of said data processing units, respectively;

detecting data excess flag set up in said data processing unit to which said mask data are assigned;

further splitting only a field including said mask data into smaller fields if said amount of mask data exceeds said data storage allowable value; and transferring said mask data included in said smaller fields to said data processing unit in which said data excess flag is not set up.

9. A method of generating graphic data by computing design data for a semiconductor integrated circuit, for use in a data processor including a plurality of data processing units connected to a data bus, each of said plurality of data processing units having a data storage allowable value and setting up a data excess flag if said design data having an amount in excess of said data storage allowable value of said first storage device are assigned to said data processing unit when said graphic data is generated by computing said design data assigned to said data processing unit, and a controller connected to said data bus, for adjusting a computation share among said plurality of data processing units while monitoring said data excess flag, said method comprising the steps of:

splitting a layout region of said semiconductor integrated circuit into a plurality of fields;

assigning said design data belonging to said plurality of fields to respective data processing units;

detecting said data excess flag set up in said data processing unit to which said design data are assigned;

further splitting only a field including said design data assigned to said data processing unit in which said data excess flag is set up into smaller fields if said data excess flag is detected; and transferring said design data included in said smaller fields respectively to said data processing units in which said data excess flag is not set up.

10. A method of converting mask data for a semiconductor integrated circuit into exposure data for mask exposure, for use in a data processor including a plurality of data processing units connected to a data bus, each of said plurality of data processing units having a data storage allowable value and for setting up a data excess flag if said mask data having an amount in excess of said data storage allowable value of said data processing unit are assigned to said data processing unit when said mask data assigned to said data processing unit is converted into said exposure data, and a controller connected to said data bus, for adjusting a computation share among said plurality of data processing units while monitoring said data excess flag, said method comprising the steps of:

splitting a layout region of said semiconductor integrated circuit into a plurality of fields;

assigning said mask data belonging to said plurality of fields to respective data processing units;

detecting said data excess flag set up in said data processing unit to which said mask data are assigned;

further splitting only a field including said mask data assigned to said data processing unit in which said data excess flag is set up into smaller fields if said data excess flag is detected; and transferring said mask data included in said smaller fields respectively to said data processing units in which said data excess flag is not set up.

11. A method of generating graphic data to form a reticle by computing design data for a semiconductor integrated circuit, for use in a data processor including a plurality of graphic processing modules connected to a data bus, each of said plurality of graphic processing modules having a data storage allowable value and for setting up a data excess flag if said design data having an amount in excess of said data storage allowable value of said graphic processing module are assigned to said graphic processing module when said graphic data is generated by computing said design data assigned to said graphic processing module, and a processing control device connected to said data bus, for adjusting a computation share among said plurality of graphic processing modules while monitoring said data excess flag, said method comprising the steps of:

splitting a layout region of said semiconductor integrated circuit into a plurality of fields;

assigning said design data belonging to said plurality of fields to respective graphic processing modules;

detecting said data excess flag set up in said graphic processing modules to which said design data are assigned;

further splitting only a field including said design data assigned to said graphic processing modules in which said data excess flag is set up into smaller fields if said data excess flag is detected; and transferring said design data included in said smaller fields respectively to said graphic processing modules in which said data excess flag is not set up.

12. A method of converting mask data for a semiconductor integrated circuit into exposure data for mask exposure, for use in a data processor including a plurality of graphic processing modules connected to a data bus, each of said plurality of graphic processing modules having a data storage allowable value and setting up a data excess flag if said mask data having an amount in excess of said data storage allowable value of said graphic processing modules are assigned to said graphic processing modules when said mask data assigned to said graphic processing modules is converted into said exposure data, and a processing control device connected to said data bus, for adjusting computation share among said plurality of graphic processing modules while monitoring said data excess flag, said method comprising the steps of:

splitting a layout region of said semiconductor integrated circuit into a plurality of fields;

assigning said mask data belonging to said plurality of fields to respective graphic processing modules;

detecting said data excess flag set up in said graphic processing modules to which said mask data are assigned;

further splitting only a field including said mask data assigned to said graphic processing module in which said data excess flag is set up into smaller fields if said data excess flag is detected; and transferring said mask data included in said smaller fields respectively to said graphic processing modules in which said data excess flag is not set up.

* * * * *